United States Patent

[11] 3,603,479

| [72] | Inventors | Josef Kuster;<br>Josef Broll, both of Dusseldorf, Germany |
|---|---|---|
| [21] | Appl. No. | 838,526 |
| [22] | Filed | July 2, 1969 |
| [45] | Patented | Sept. 7, 1971 |
| [73] | Assignee | Benz & Hilgers GmbH<br>Dusseldorf, Germany |
| [32] | Priority | July 10, 1968 |
| [33] | | Germany |
| [31] | | P 17 61 814.3 |

[54] APPARATUS FOR SEPARATION AND TRANSPORTING OF CONTAINERS STACKED UP INTO EACH OTHER
8 Claims, 4 Drawing Figs.

[52] U.S. Cl. .................................................. 221/210, 221/290, 198/210
[51] Int. Cl. .................................................. B65h 3/32
[50] Field of Search .................................................. 221/210, 219, 217, 222, 224, 236, 277, 290, 298; 198/25, 103, 104, 105, 210

[56] References Cited
UNITED STATES PATENTS

| 1,539,258 | 5/1925 | Graupner | 198/210 |
| 2,570,198 | 10/1951 | Brager | 221/277 X |
| 2,574,794 | 11/1951 | Maxwell | 221/236 X |
| 2,950,805 | 8/1960 | Heimlicher et al. | 198/210 X |
| 3,098,585 | 7/1963 | Giepen | 221/222 X |

Primary Examiner—Robert B. Reeves
Assistant Examiner—David A. Scherbel
Attorney—Ernest G. Montague ABSTRACT: An apparatus for separation and transporting of containers of paper, cardboard, synthetic material foil or the like, which comprises separation means for a staple of containers. A feeding device includes substantially two conveyor wheels mounted horizontally and continuously rotating. A transporting device is provided and driving members are arranged laterally projecting from the conveyor wheels and having guide slots and pointing towards each other. The axis of the staple and the transporting device are disposed tangentially to the rotating path of the driving members. Means are arranged for causing an additional rotating movement of the driving members about their axis, whereby the guide slots of the driving members are parallel relative to each other in each moving phase of the conveyor wheels.

PATENTED SEP 7 1971

INVENTORS
Josef Küster
Josef Broll
BY Ernest Montague
Attorney

APPARATUS FOR SEPARATION AND TRANSPORTING OF CONTAINERS STACKED UP INTO EACH OTHER

The present invention relates to an apparatus for separation and transportation of containers of cardboard, paper cartons, foils of synthetic materials or the like by means of a staple remover and a feeding device, which containers are stacked up into each other.

Apparatus of this type are known for some time. They are preset as a rule to packing machines, whereby the empty, cup-shaped containers are removed from the staple and are fed by means of a conveying device for instance to a dosing device.

In slowly moving packing machines the staple remover device suffices already, completely, in order to set the containers simultaneously with the separation on a transport band, a cell chain or a rotary table equipped with recesses, whereby the containers fall after a predetermined path, by using their own weight and therefore are left for themselves. The higher, however, the packing output of the machine, the more decisive is an exact transportation of the containers from the staple up to the dosing station while using means for forcibly transmitting the containers. The difficulty which is inherent in the problem of enforced guiding, becomes still greater, as long as a continuous movement of the containers is added to the high output during the filling and closing, because a likewise flowing movement of the forced guide means is required therefore.

To this type of guide means belongs a bucket elevator for cups, consisting of two pairs of chain wheels, the two feeding chains of which are disposed adjacent each other such, that drivers laterally projecting from and secured to the chain members operate like carrying ledges moved toward each other, which carrying ledges grip underneath the containers on both sides separated above the pair of chains and put them rather below onto a transportation band, whereby due to the turning around of the drivers about the lower chain wheels the containers are automatically freed. Of disadvantage with this device is not only the inexact transfer of the cups to the uppermost driver pair, but also the vertical mounting onto the moved conveyor band disposed crosswise thereto, which conveyor band requires a particular safety against tipping of the light, empty containers.

It is one object of the invention to provide an apparatus for separation and transporting of containers stacked up into each other, which avoids the drawbacks and inconveniences of the known structures.

It is another object of the invention to provide an apparatus for separation and transporting of containers stacked up into each other, wherein a separation device with the container staple, is disposed between a conveyor device consisting of two horizontally mounted and continuously moving conveyor wheels, whereby the staple axis as well as a further transportation device is arranged tangentially to the path of the driver members projecting laterally from the conveyor wheels and pointing toward each other, which driver members in turn are subjected to an additional rotary movement about their axis, so that the guide slots of the driving members run parallel to each other in each phase of the movement of the conveyor wheels.

The extension of the staple axis into the movement path of the driver members serves the purpose not to leave the containers to themselves during the transfer from the staple to the conveyor wheel even for a second. The advantage of the continuously revolving conveyor wheels is observable also during the transfer onto the transportation bands or the like pertaining to the packing machine, as the containers have obtained already, due to the conveyor wheel the same speed and the same direction of movement as the transportation band disposed therebelow.

A further advantage, which pertains to the driver members, resides in the fact, that by the coordination to a conveyor wheel of a sun wheel and a plurality of planet wheels to a conveyor wheel, a leading rotary movement is provided for the driving members driven by the planet wheels and guided by the conveyor wheels with which rotary movement the driving members with their guide slots gripping the container edges run parallel to each other in each movement phase of the conveyor wheels. By this arrangement it is assured, that the reception of the containers from the staple, as well as the transfer thereof to the conveyor band takes place in the same plane. With these different particular arrangements, to which belongs also the staple removal by means of rotating separating disks, a reliable separation and a very exact transportation of the containers is assured even in case of a greater working output of the machine.

With these and other objects in view, which will become apparent in the following detailed description, the present invention will be clearly understood in connection with the accompanying drawings, in which.

Figure 4:
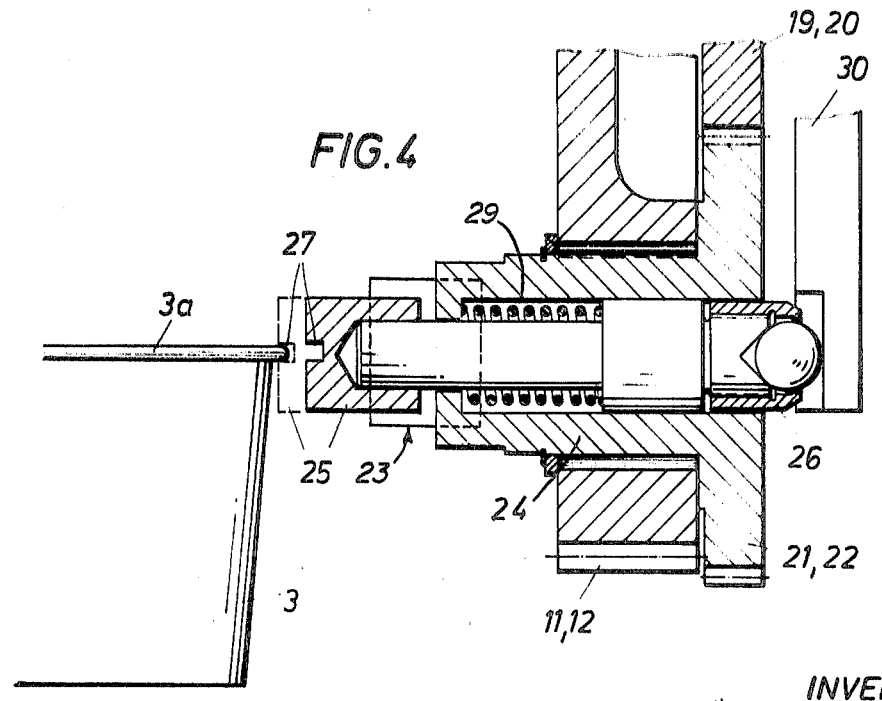
FIG. 4 is a longitudinal section of a driver member.

Referring now to the drawings, the apparatus, designed in accordance with the present invention, comprises a carrying plate 1 having a large bore 1a. On the carrying plate 1 are provided a container staple 2 with guide rods 4 limiting the containers 3 which are set into each other, as well as a separating device 5, which comprises substantially a plurality of separating disks 6, arranged within the range of the lowermost containers 3. The separating disks 6 can be equipped with grooves 6a extending spirally and threaded spirallike, respectively, which serve for reception of the container edges 3a (FIG. 4). In order to insure a uniform rotation of the separating disks 6, their carrying spindles 7 are equipped above the carrying plate 1 with conveyor disks 8 or with chain wheels, which are connected by means of a joint driving means for instance of a V-belt or a member chain 9. By the plurality of the separating disks 6 distributed about the container periphery and by its joint drive it is assured, that the container edges 3a are gripped by all separating disks 6 simultaneously and are also released simultaneously.

The separating device 5 is followed by a feeding or conveyor device 10 receiving the separated containers 3, the object of which conveying device 10 is to feed the containers 3 to a dosing- and filling-device on a high output packing machine.

Figure 1:
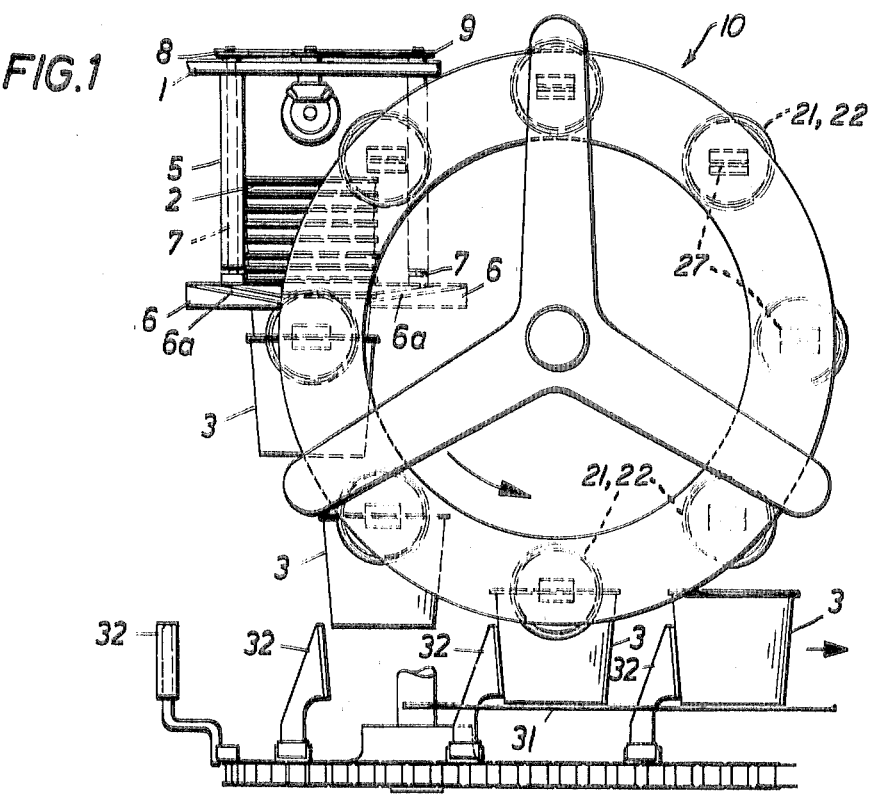
FIG. 1 is a front elevation of a staple remover and conveyor device.
Figure 2:
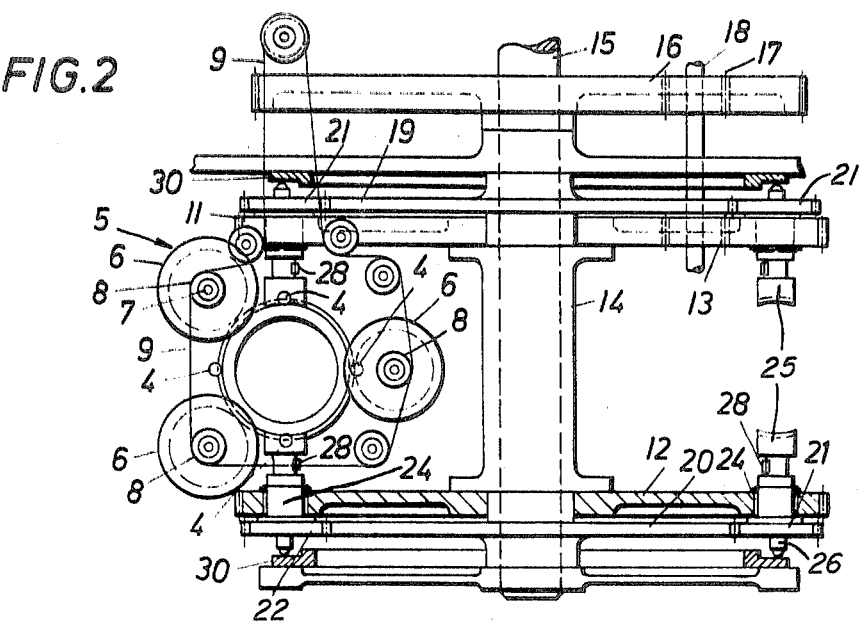
FIG. 2 is a top plan view, partly in section, of a staple remover and conveyor device.

The conveyor device 10 comprises two conveyor wheels 11 and 12, disposed spaced apart from each other. Of the conveyor wheels 11 and 12, the conveyor wheel 11 is in mesh with a driver wheel 13 and the other conveyor wheel 12 is a disk wheel. Both conveyor wheels 11 and 12 sit on a hub 14, which in turn has a shaft 15 projecting therethrough. The disk wheel 12 is connected by the hub in common with the conveyor wheel 11. The shaft 15 is driven with an intermediate large spur gear 16 by a drive gear 17, which sits on the same drive shaft 18 as the drive wheel 13. Furthermore, rigidly secured to the shaft 15 are disposed two sun gears 19 and 20, to which planet gears 21 and 22 are coordinated. The number of the planet gears 21 and 22 is identical with the number of the driving members 23, which comprise substantially a driver hub 24 is connected with the planet gears 21 and 22 and projecting into peripheral bores the conveyor wheels 11 and 12, and an axle 26 is axially displaceable in the driver hub 24 and carries the driver head 25. The driver head 25 sitting on the axle 26 is substantially a one- or multipart, rectangular block with a guide slot 27 which receives the container edge 3a, as shown in FIG. 4. In order that the driver head 25 and the axle 26 cannot perform their own rotary movement relative to the hub 24 in addition to the axle movement, a guide rail 28 is secured to the hub 24 in which the driver head 25 is guided nonrotatably and slidably in axial direction. The guide rod is secured one-sided to the hub 24, as it appears from FIGS. 2 and 3. Furthermore, a helical spring 29 takes care, that the axle 26 after the passing of a curve portion 30 returns automatically to its original position.

Below the conveyor wheels 11 and 12 are disposed a transportation path 31, the grippers 32 of which feed the mounted containers 3 to a filling- and dosing-station of the packing machine.

Figure 3:
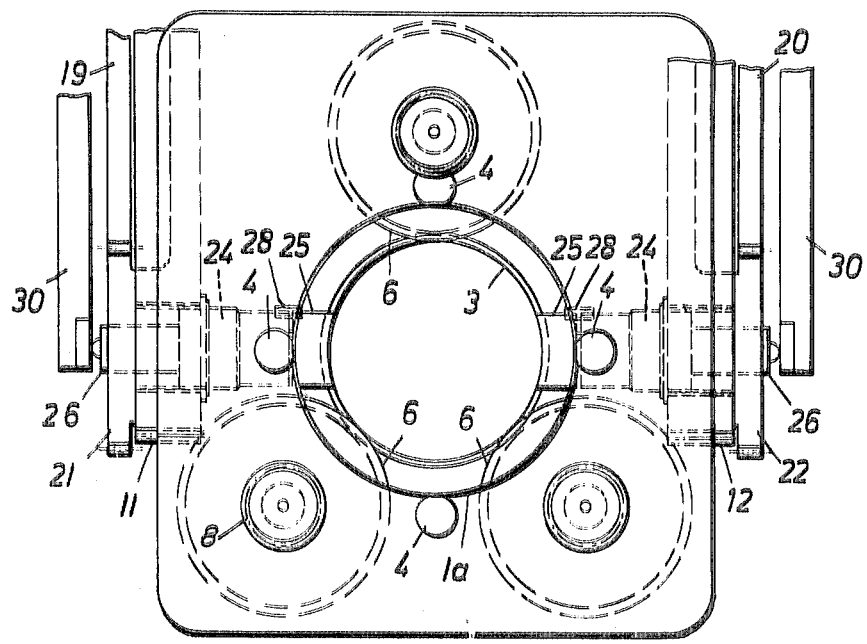
FIG. 3 is a fragmentary view at a larger scale of the staple remover and conveyor device disclosed in FIG. 2.

The operation is as follows:

Since the driving members 23 during their rotary movement are cut at about the height of the rotary axis of the conveyor wheels 11 and 12 from the staple axis, as it is shown in FIG. 3, at this point, the transfer of the containers 3 begins to the driving members 23, whereby the guide slots 27 of the driving head 25 receive the container edges 3a in the same horizontal position. During the following movement of the conveyor wheels 11 and 12, up to the delivery to the transportation path 31, the position of the guide slots 27 changes as little as well as on the remaining path. This is brought about such that the spur gear 16, as well as the sun gears 19 and 20 with the planet gears 21 and 22, constituting a single drive unit, have a transmission ratio, that they perform a movement path, which corresponds to about 1.25 of the path performed in the same time by the conveyor wheels 11 and 12 during one rotation. By this arrangement a rotary lead of the planet gears 21 and 22 is obtained, by which the guide slots 27 of the driving members 23 run parallel to each other in each movement phase of the conveyor wheels 11 and 12. Since the containers 3 are joined with the same speed by the conveyor wheels 11 and 12 as the speed of the transportation path 31, the containers 3 cannot be set on the transportation path 31 more carefully.

In view of the plurality of the driver members 23 on the conveyor wheels 11 and 12, a greater conveyor output is possible, whereby it is assured, that the separation from the staple 2 operates the reception by the conveyor wheels 11 and 12, as well as the transfer towards the transportation path 31 without objection, as is experienced with a slowly moving machine. As additional help, the grippers 32 serve on the transportation paths 31, which grippers 32 feed the containers 3 equally spaced apart to the dosing- and feeding-device.

While we have disclosed several embodiments of the present invention, it is to be understood that these embodiments are given by example only, and not in a limiting sense.

We claim:

1. An apparatus for separation and transporting of containers of paper, cardboard, synthetic material foil or the like, comprising
    separation means for a staple of containers,
    a feeding device, for receiving separated containers from said staple of containers and said separation means, including substantially two conveyor wheels mounted horizontally and continuously rotating,
    a transporting device disposed in the path of movement of said feeding device and for receiving containers from said feeding device,
    driving members laterally projecting from said conveyor wheels and pointing towards each other, said driving members defining guide slots adapted to receive therein portions of said containers,
    said driving members including means for moving said driving members into and out of engagement, respectively, with each container,
    the axis of said staple of containers and said transporting device being disposed tangentially to the rotating path of said driving members, and
    means for causing an additional rotating movement of said driving members about their axis, in order that said guide slots of said driving members are parallel relative to each other in each moving phase of said conveyor wheels.

2. The apparatus, as set forth in claim 1, wherein
    one of said two conveyor or wheels constitutes a first gear,
    a drive gear,
    said first gear operatively connected with said drive gear,
    a hub,
    the other of said two conveyor wheels constitutes a disk wheel connected by means of said hub in common with that of said first gear, and
    both said first gear and said disk wheel including bores at their periphery for guidance of said driving members therein.

3. The apparatus, as set forth in claim 2, which includes
    a shaft projecting through said hub,
    a sun gear rigidly secured to said shaft projecting through said hub and coordinated to said conveyor wheels, and
    a plurality of planet gears carrying said driving members and engaging said sun gear.

4. The apparatus, as set forth in claim 3, wherein said sun gear has a transmission ratio with said conveyor wheels of 1.25:1.

5. The apparatus, as set forth in claim 4, wherein
    said driving members each include,
    a driver hub connected with one of said planet gears and projecting into one of said bores of said conveyor wheels,
    an axle axially displaceably controlled in said driver hub, and
    a driver head carried by said axle.

6. The apparatus, as set forth in claim 1, wherein said means for moving said driving members into and out of engagement, respectively, with each container constitutes a clamping means.

7. The apparatus, as set forth in claim 1, wherein
    each of said driving members including said means for moving said driving members into and out of engagement, respectively, with each container comprises,
    a driver head having said guide slot therein adapted to receive one of said containers,
    a driver hub in which said driver head is operatively axially shiftable,
    an axle slidably disposed in said driver hub and connected to said driver head, and
    a circular cam surface,
    a helical spring disposed in said driver hub and operatively positioned to press an end of said axle against said cam surface, the latter causing said axle to shift and said driver head to move into and out of engagement with said container by means of said slot in timed relation to the positions of said separating means, and said transporting device, respectively.

8. The apparatus, as set forth in claim 7, wherein said driving members are disposed in pairs with said driver heads axially aligned opposite one another for cooperatively engaging and releasing a container therebetween.